United States Patent
Levesque et al.

(10) Patent No.: US 7,493,195 B2
(45) Date of Patent: Feb. 17, 2009

(54) FLUID REGULATION CONTROL

(75) Inventors: Peter S. Levesque, Norwood, MA (US); Harold R. Smart, Portsmouth, RI (US)

(73) Assignee: Dresser, Inc., Addison, TX (US)

( * ) Notice: Subject to any disclaimer, the term of this patent is extended or adjusted under 35 U.S.C. 154(b) by 305 days.

(21) Appl. No.: 11/419,161

(22) Filed: May 18, 2006

(65) Prior Publication Data

US 2006/0260702 A1   Nov. 23, 2006

Related U.S. Application Data (60) Provisional application No. 60/714,553, filed on May 20, 2005.

(51) Int. Cl.
*G05D 3/12* (2006.01)
(52) U.S. Cl. ............... 700/295; 137/504; 137/115.13; 137/486; 73/114.18
(58) Field of Classification Search .............. 700/282, 700/287, 289, 301; 415/62; 137/115.13, 137/486, 504; 73/114.18
See application file for complete search history.

(56) References Cited

U.S. PATENT DOCUMENTS

| | | | |
|---|---|---|---|
| 4,481,967 A | 11/1984 | Frick | |
| 5,499,647 A | 3/1996 | Robert | |
| 5,573,032 A | 11/1996 | Lenz et al. | |
| 5,906,218 A * | 5/1999 | Carey | 137/82 |
| 6,804,618 B2 * | 10/2004 | Junk | 702/77 |
| 7,039,537 B2 | 5/2006 | Junk | |
| 7,283,894 B2 * | 10/2007 | Esposito et al. | 700/282 |
| 2004/0074311 A1 | 4/2004 | Lull et al. | |
| 2005/0021213 A1 | 1/2005 | Miller | |

FOREIGN PATENT DOCUMENTS

| | | |
|---|---|---|
| CA | 2019795 | 2/1991 |
| DE | 40 26 850 | 3/1991 |
| WO | WO 2004/033956 A | 4/2004 |

OTHER PUBLICATIONS

International Search Report, PCT/US2006/019644, Feb. 19, 2007, pp. 1-4.
Written Opinion of the International Searching Authority, PCT/US2006/019644, Feb. 19, 2007, pp. 1-7.
International Preliminary Report on Patentability, PCT/US2006/019644, Aug. 6, 2007, pp. 1-10.

* cited by examiner

*Primary Examiner*—Kamini S Shah
*Assistant Examiner*—Sheela Rao
(74) *Attorney, Agent, or Firm*—Fish & Richardson P.C.

(57) ABSTRACT

Controlling fluid regulation may provide increased efficiency and reliability. In one general aspect, a system and process for fluid regulation may include the ability to receive a command signal, generate a control signal based on the command signal, and move a magnetizable element relative to a wire coil in accordance with the control signal, the movement affecting a pressure in a pressure cavity. The system and process may also include the ability to sense the pressure in the pressure cavity due to the position of the magnetizable element and adjust the control signal based on the sensed pressure and the command signal. The system and process may further include the ability to sense a second parameter of the fluid regulation system and adjust the command signal based on the second parameter.

23 Claims, 4 Drawing Sheets

FLUID REGULATION CONTROL

RELATED APPLICATIONS

This application claims priority to U.S. Provisional Application No. 60/714,553, filed on May 20, 2005 and entitled "Fluid Regulation Control."

TECHNICAL FIELD

This disclosure relates to regulation and, more particularly, to fluid regulation.

BACKGROUND

Fluid regulators are used in a wide variety of environments for both commercial and industrial applications. For example, fluid regulators find use in pipeline systems, chemical plants, and building environmental systems. Regardless of environment or application, most modern fluid regulators are controlled by some type of logic-driven controller, whether located with or remote from the fluid regulator. A controller allows a fluid regulator to be controlled in an intelligent manner to achieve one or more desired effects (e.g., flow rate, pressure, temperature, level, energy efficiency, etc.).

A common type of fluid regulator controller operates by pneumatic techniques. This type of controller often receives an external air supply and manipulates the air supply in response to electronic commands to actuate the fluid regulator appropriately. Thus, a pneumatic controller is often said to include an electric-to-pressure converter. Depending on the fluid regulator to be actuated, a pneumatic fluid regulator controller may also include a second pneumatic component. This second stage of the controller may amplify the pressure and/or volumetric flow rate of the output of the electric-to-pressure converter. Common devices for accomplishing this include a spool valve and a pneumatic relay.

One type of electric-to-pressure converter includes an electric coil and a magnetic core that move relative to each other. The movement occurs in response to a command signal, which changes the current in the coil and energizes the magnetic core, and adjusts the output pressure. In one arrangement, the magnetic core includes a hinged flapper that moves relative to the body of the core and the electric coil to adjust the output pressure. This arrangement, however, may have significant hysteresis, deadband, and non-linearity, which makes it difficult to accurately control. In another arrangement, the electric coil moves relative to the magnetic core, which provides low hysteresis and good linearity for the converter. Unfortunately, the second arrangement is expensive to construct due to the required tolerances and can be unreliable due to exposure of the fine wire that is required.

SUMMARY

The ability to control fluid regulation is a requirement for a variety of commercial and industrial settings. Improving the control of fluid regulation may increase efficiency and reliability.

In one general aspect, a fluid regulation system may include a pressure cavity, an electric-to-pressure converter, a sensor, and a processor. The pressure cavity may be operable to receive a pressure supply, and the electric-to-pressure converter may include a wire coil, a magnetizable element movable relative to the wire coil, a pressure sensor, and a controller. The magnetizable element may move relative to the wire coil as the coil is energized according to a control signal, the position of the element affecting the pressure in the pressure cavity. The pressure sensor may be coupled to the pressure cavity and operable to sense the pressure in the pressure cavity due to the position of the magnetizable element and to generate a signal representative thereof. The controller may be coupled to the wire coil and the pressure sensor and operable to generate the control signal in response to a command signal and to adjust the control signal based on the pressure sensor signal and the command signal. The sensor may be operable to sense a second parameter of the fluid regulation system and to generate a signal representative thereof, and the processor may be coupled to the electric-to-pressure converter and the second sensor. The processor may be operable to generate the command signal and to adjust the command signal based on the second sensor signal.

The controller may be operable to amplify a difference between the pressure sensor signal and the command signal to adjust the control signal based on the pressure sensor signal and the command signal. The controller may also be operable to suppress high-frequency gain. The electric-to-pressure converter may further include a signal conditioner operable to convert the pressure signal to the command signal format.

In certain implementations, the pressure cavity may include a pressure conduit having an orifice that discharges onto the magnetizable element. Also, the electric-to-pressure converter may include a magnetic core around which the wire coil is disposed, the magnetizable element being proximate an end of the wire coil. The pressure sensor may, for example, be a piezo-type sensor. The pressure sensor may also be partially compensated (e.g., for zero).

Particular implementations may include a sensor operable to sense a third parameter of the fluid regulation system and generate a signal representative thereof. The processor may be coupled to the third sensor and operable to receive a signal representative of the third parameter and adjust the command signal based on the second parameter and the third parameter. The second parameter may, for example, be the position of a fluid regulator component (e.g., a stem), and the third parameter may, for example, be the environment temperature.

The processor may also be operable to receive instructions for regulating the fluid regulation system. The instructions may, for example, include a set point. The frequency response of the control provided by the controller may be approximately ten times faster than the frequency response of the control provided by the processor.

In another general aspect, a process for fluid regulation at a fluid regulation system may include generating a control signal based on a command signal and moving a magnetizable element relative to a wire coil in accordance with the control signal, the position of the element affecting a pressure in a pressure cavity. The process may also include sensing the pressure in the pressure cavity due to the position of the magnetizable element and adjusting the control signal based on the sensed pressure and the command signal. The process may further include sensing a second parameter of the fluid regulation system and adjusting the command signal based on the second parameter.

Adjusting the control signal based on the sensed pressure and the command signal may include converting the sensed pressure into the command-signal format, comparing the pressure signal and the command signal, and amplifying a difference between the signals. Comparing the pressure signal and the command signal may, for example, include subtracting the pressure signal from the command signal. Adjusting the control signal may further include reducing high-frequency gain of the amplified difference.

In certain implementations, the process may include sensing a third parameter of the fluid regulation system and adjusting the command signal based on the second parameter and the third parameter. The process may also include receiving instructions for regulating the fluid regulation system.

The frequency response of the control provided by adjusting the control signal based on the sensed pressure and the command signal may be approximately ten times faster than the frequency response of the control provided by adjusting the command signal based on the second parameter.

In a particular aspect, a system for fluid regulation includes a pneumatic supply line, an electric-to-pressure converter, a position sensor, and a processor. The supply line is operable to receive a pneumatic pressure supply and includes an orifice. The electric-to-pressure converter includes a wire coil, a nickel-iron alloy element movable relative to the wire coil in proximity to the orifice, a partially-compensated pressure sensor, a signal conditioner, and a controller. The wire coil is operable to be energized according to a control signal to move the magnetizable element, the position of the element affecting the pneumatic pressure in a pressure cavity. The pressure sensor is coupled to the pressure cavity and operable to sense the pressure in the pressure cavity due to the position of the magnetizable element and to generate a signal representative thereof. The signal conditioner is operable to convert the pressure signal to a command-signal format, and the controller is coupled to the wire coil and the signal conditioner. The controller is operable to generate the control signal in response to a received command signal and to adjust the control signal based on the converted pressure sensor signal and the command signal by amplifying a difference between the converted pressure sensor signal and the command signal and suppressing high-frequency gain. The position sensor is operable to sense a position of a fluid regulator component and to generate a representative signal. The processor is coupled to the electric-to-pressure converter and the position sensor and operable to receive instructions for regulating the fluid regulation system, to generate the command signal, and to adjust the command signal based on the position sensor signal. The frequency response of the control provided by the controller is approximately ten times faster than the frequency response of the control provided by the processor.

Various implementations may include one or more features. In particular implementations, for example, one or more undesirable effects (e.g., hysteresis, deadband, and/or non-linearity) of an electric-to-pressure converter having a moving-magnetizable element may be reduced. Alleviating of one or more undesirable effects for this type of converter may also allow other features to be realized, such as the ability to use larger wires sizes for a wire coil, which may increase manufacturability and reliability, the ability to make the wire coil stationary, which may reduce the sprung mass and allow for a more tolerant mechanical system due to the effects of vibration, and the ability to protect the wire coil from the environment, which may increase robustness.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Fluid regulation may be achieved by a fluid regulator (e.g., a valve) that is controlled by a fluid regulator controller (e.g., a valve positioner). Improving the predictability of the performance of the fluid regulator controller typically improves the performance of the fluid regulator. In particular implementations, a fluid regulator controller including a magnetizable element movable relative to an electric coil may be used, even though such configurations tend to have significant hysteresis, deadband, and/or non-linear performance, by providing a feedback control loop to redress at least some of the problems with the configuration.

Figure 1:
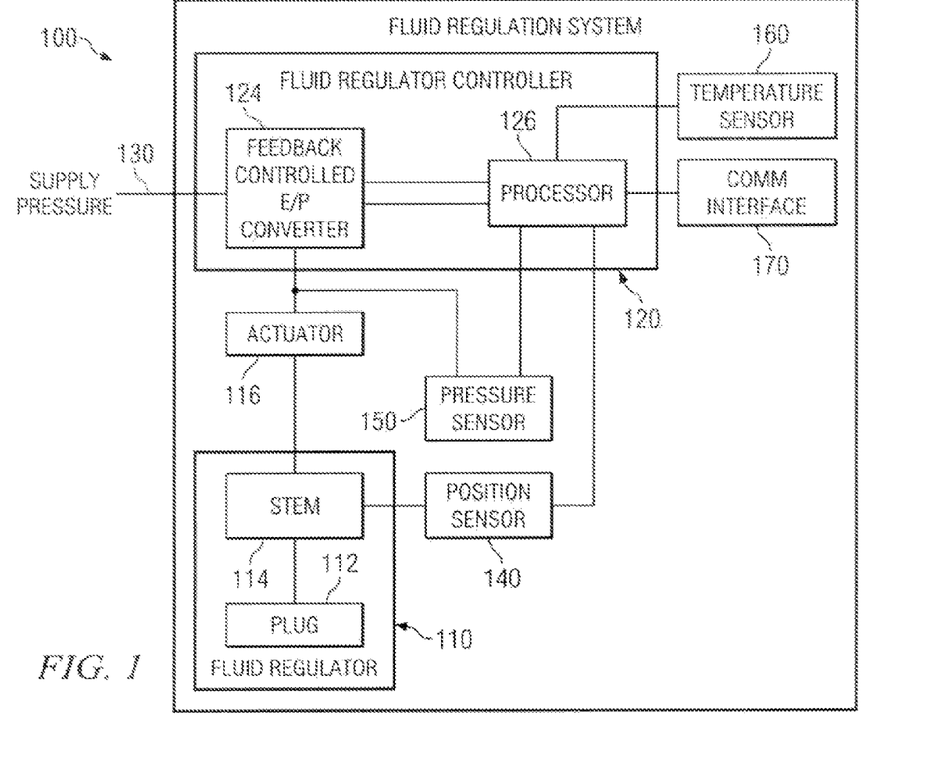
FIG. 1 is a block diagram illustrating one implementation of a fluid regulation system.

FIG. 1 illustrates one implementation of a fluid regulation system 100. Fluid regulation system 100 includes a fluid regulator 110, an actuator 116, and a fluid regulator controller 120. Fluid regulator 110 physically interacts with a fluid (liquid and/or gas) to affect it, and actuator 116 controls fluid regulator 110. Fluid regulator controller 120, in turn, controls actuator 116 and, hence, regulates the fluid.

In more detail, fluid regulator 110 includes a plug 112 and a stem 114. Plug 112 is responsible for interfacing with a fluid to be regulated to alter its characteristics (e.g., flow and/or pressure). To alter the fluid characteristics, plug 112 typically moves within a volume in which the fluid exists, which may or may not be part of the fluid regulator. Plug 112 may be composed of plastic, metal, rubber, composite, and/or any other appropriate material. Stem 114 is coupled to plug 112 and is responsible for communicating translational motion to move plug 112 relative to the regulated fluid. Stem 114 may, for example, be a rod, shaft, or strut that is composed of metal or other appropriate material. In particular implementations, fluid regulator 110 may be a valve (e.g., a globe valve). In other implementations, however, fluid regulator 110 may be any other appropriate device for affecting a fluid.

Actuator 116 is coupled to stem 114 and is responsible for moving the stem and, hence, plug 112. In this implementation, actuator 116 is a pneumatic actuator that receives a pressure from fluid regulator controller 120. Actuator 116 may, for example, include a piston subjected to differential pressure or a pressure-activated spring. In certain implementations, actuator 116 may be part of fluid regulator 110 or fluid regulator controller 120.

Fluid regulator controller 120, which may, for example, be a valve positioner, includes a feedback-controlled electric-to-pressure converter 124 and a processor 126. Electric-to-pressure converter 124 is coupled to actuator 116 and responsible for converting electrical command signals (current and/or voltage) to pressure control signals for actuator 116. To accomplish this, electric-to-pressure converter 124 is pneumatically powered and receives a pressure from supply line 130. Electric-to-pressure converter 124 may, for example, include a magnetizable element (e.g., a flexure composed of a nickel-iron alloy) that is movable relative to an electric loop (e.g., a coil of copper wire). The movement of the magnetizable element affects the pressure conveyed to actuator 116 and, hence, the position of plug 112. The electric-to-pressure converter may also include feedback control to alleviate many of the problems that are prevalent in such a configuration (e.g., hysteresis and/or non-linearity).

Processor 126 is coupled to electric-to-pressure converter 124 and is responsible for determining how to control plug 112 and generating electrical command signals for electric-to-pressure converter 124. The electrical command signals may, for example, represent a pressure set point. Processor 126 may be a microprocessor, a microcontroller, a field-programmable gate array (FPGA), or any other appropriate device for manipulating information in a logical manner. Processor 126 typically includes memory, which may be random-access memory (RAM), read-only memory (ROM), compact-disk read-only memory (CD-ROM), registers, and/or any other appropriate device for storing information. The memory may store instructions for the processor, data regarding fluid regulation system 100, and/or any other appropriate information. Processor 126 may also receive data from electric-to-pressure converter 124. For example, processor 126 may receive data regarding pressures generated by the electric-to-pressure converter in response to the command signal. Processor 126 may, for instance, use this data for diagnostic purposes.

Fluid regulation system 100 also includes a position sensor 140, a pressure sensor 150, and a temperature sensor 160. Position sensor 140 is responsible for determining the position of stem 114, which correlates with the position of plug 112, and providing this information to processor 126. Position sensor 140 may operate by electrical, electromagnetic, optical, and/or mechanical techniques and may or may not be actually coupled to stem 114. In particular implementations, position sensor 140 may be an electromagnetic sensor (e.g., a Hall-effect sensor). Pressure sensor 150 is coupled to the pressure line between electric-to-pressure converter 124 and actuator 116 and responsible for determining the pressure delivered by electric-to-pressure converter 124 to actuator 116 and providing this information to processor 126. Pressure sensor 150 may, for example, be a piezo-type sensor. Temperature sensor 160 is responsible for determining the temperature in and/or around fluid regulation system 100 and providing this information to processor 126. Temperature sensor 160 may, for example, be a resistive-temperature device or a thermocouple.

Fluid regulation system 100 additionally includes a communication interface 170. Communication interface 170 is coupled to processor 126 and allows the processor to send and receive information outside of fluid regulation system 100. The sent information may, for example, include one or more conditions of the regulated fluid and/or the fluid regulation system. The received information may, for example, include commands and/or instructions for regulating the fluid and/or status inquiries. Communication interface 170 may be a modem, a network interface card, a wireless transceiver, or any other appropriate device for sending and receiving information. The communication interface may operate by wireline (e.g., IEEE 802.3, Foundation Fieldbus, HART, or 4-20 mA) or wireless (e.g., IEEE 802.11, IS-95, IS-136) techniques. In particular implementations, fluid regulator controller 120 may extract power from the signals received through the communication interface.

In one mode of operation, processor 126 determines the appropriate position for plug 112, perhaps based on instructions received through communication interface 170, and generates a command signal representative of the position for electric-to-pressure converter 124. In particular implementations, the signal may form or be part of a structured message (e.g., a packet). Electric-to-pressure converter 124 converts the command signal to a pressure, which is sent to actuator 116. A control loop in the electric-to-pressure converter allows the electric-to-pressure converter to respond in a behaved manner to the command signal. Actuator 116 attempts to move stem 114, and, hence, plug 112, in accordance with the applied pressure.

Also during operation, position sensor 140 ascertains the position of stem 114 and provides a signal representing the position to processor 126. Processor 126 compares the determined position for stem 114 with the position sensed by position sensor 140 and adjusts the command signal to electric-to-pressure converter 124 to achieve the appropriate position.

In addition to the stem position, processor 126 receives information regarding the pressure signal from electric-to-pressure converter 124 to actuator 116 (from pressure sensor 150) and the environment temperature (from temperature sensor 160). Processor 126 can then determine whether any adjustments need to be made regarding the determined position and/or whether the fluid regulation system is behaving properly (e.g., by examining position response time), which may also require adjustments. In particular, processor 126 may ensure that the pressure is set at the appropriate level.

If adjustments should be made, processor 126 can generate another command signal for electric-to-pressure converter 124. Additionally, processor 126 may generate messages representing the status (parameters values and/or condition) of fluid regulation system 100 and send the messages through communication interface 170. A status message may, for example, be sent in response to a query received through the communication interface. Also, an alert message, possibly of an appropriate level, may be generated if conditions warrant. In certain implementations, the alert message may correspond to a color that represents the health of the fluid regulation system.

By adding closed-loop control to electric-to-pressure converter 124, the operation of fluid regulator controller 120 may be improved. This is at least in part due to the fact that processor 126 may expect the output of the electric-to-pressure converter to correlate with the command signal to the electric-to-pressure converter. Also, the processor may expect the output of the electric-to-pressure converter to be repeatable. Furthermore, the time constant of the electric-to-pressure converter may be decreased (e.g., from 200 ms to 100 ms), which may provide faster response times and better regulation. The time constant of the loop controlled by processor 126 may be approximately 15 ms.

In particular implementations, it may be important to keep an appropriate separation between the frequency responses of the control loop for electric-to-pressure converter 124 and the control loop around electric-to-pressure converter 124 (e.g., the processor-controlled loop). For example, the inner control loop may have a frequency response that is approximately an order of magnitude faster than the outer control loop. If the ratio between the frequency responses of the loops becomes too low, undesirable oscillations may occur. If the ratio between the frequency responses of the loops becomes too high, noise may begin to adversely affect the system.

In certain implementations, the command signal required to properly control electric-to-pressure converter 124 may have a relatively-large dynamic range. To accommodate the dynamic range for a digital command signal, a relatively fast conversion scheme may be needed for converting the digital signal to an analog signal; otherwise, an analog signal with significant oscillations or slow rise times may be introduced to the electric-to-pressure converter, which may deleteriously affect converter performance.

One way to produce an analog signal from a digital signal is to use a pulse-width modulator. In this technique, a rectangular wave with a duty cycle proportional to a digital value is produced. The wave is then smoothed over time (e.g., by a lag filter) to produce an analog signal proportional to the digital value.

To produce an analog signal faster from a digital signal using a pulse-width modulator, the clock speed of the pulse-width modulator may be increased. For example, the clock speed may be increased to produce a fourteen-bit signal in the time that a nine-bit signal is produced (i.e., by a factor of 32). Another way to achieve faster signal production with a pulse-width modulator technique is to use two pulse-width modulators and a signal combiner, where the first pulse-width modulator is operable to generate a first signal having a length corresponding to a first portion of a digital signal value, and the second pulse-width modulator is operable to generate a second signal having a length corresponding to a second portion of the digital signal value. The signal combiner is coupled to the first pulse generator and the second pulse generator and is operable to combine the first signal and the second signal in a weighted manner. This technique may consume less power than the first technique.

Figure 2:
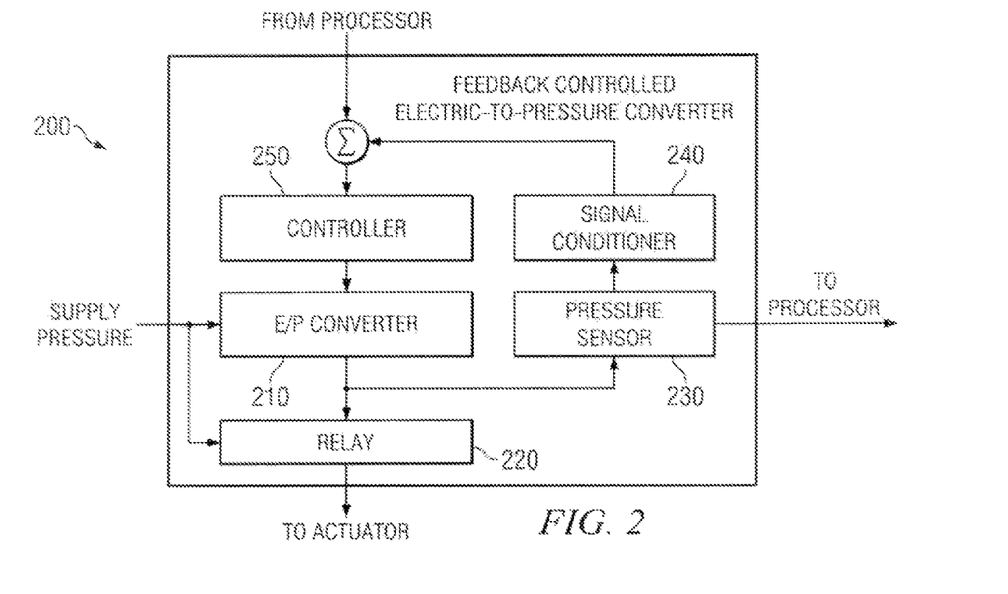
FIG. 2 is a block diagram illustrating one implementation of a feedback-controlled electric-to-pressure converter for a fluid regulation system.

FIG. 2 illustrates a feedback-controlled electric-to-pressure converter 200. Electric-to-pressure converter 200 may be one example of a feedback-controlled electric-to-pressure converter for a fluid regulation system such as system 100.

Feedback-controlled electric-to-pressure converter 200 includes an electric-to-pressure converter 210 and a relay 220. Converter 210 may include an element that is movable relative to a wire coil depending on the electrical energy supplied to the coil. The element may be movable by being composed of a magnetizable material (e.g., a nickel-iron alloy, another soft magnetic material, or any other appropriate material). The movement of the element affects the pressure in a pressure cavity, which may be any appropriate housing for a fluid.

Figures 3, 5:
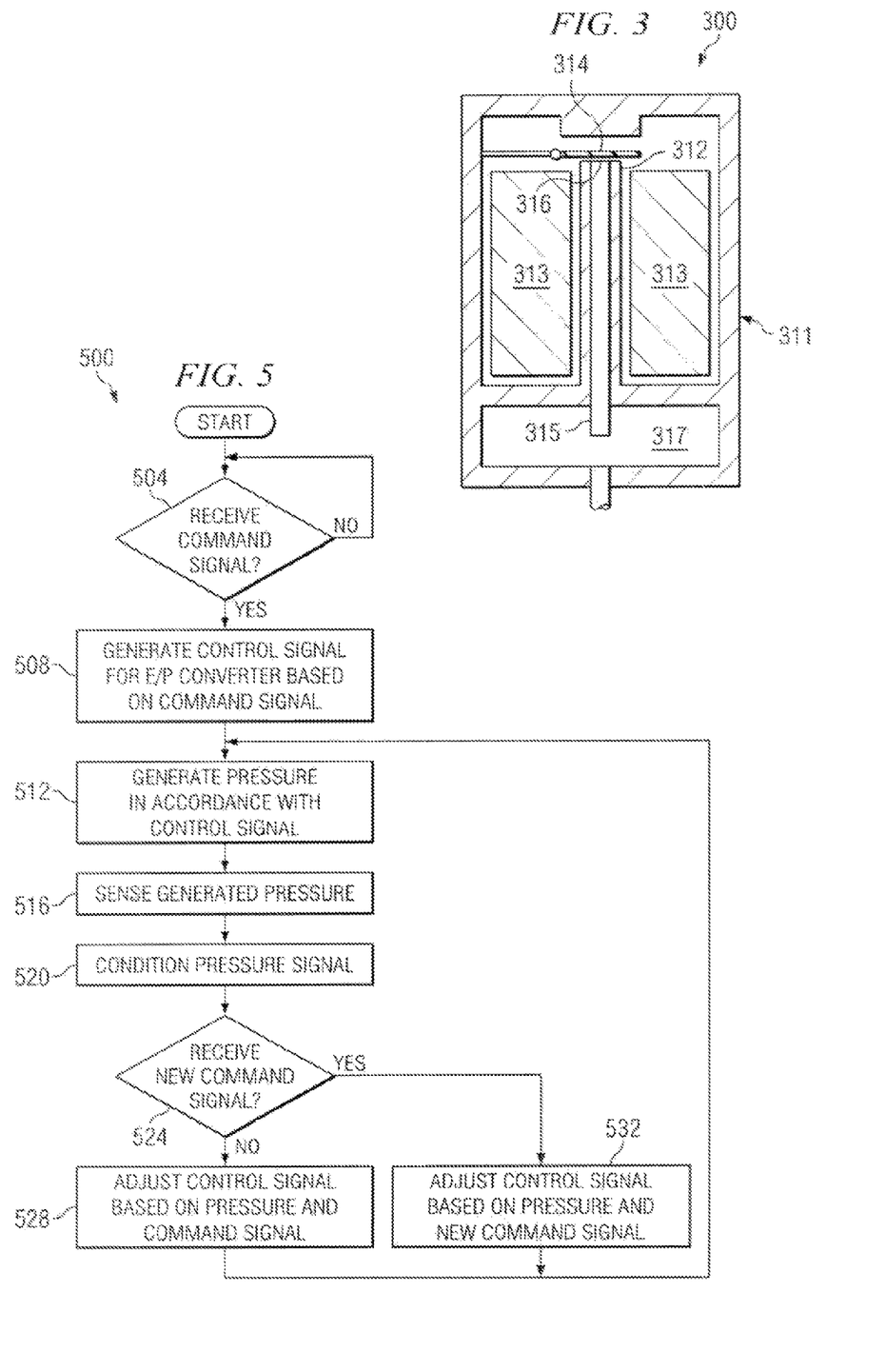
FIG. 3 is a simplified cross-sectional view illustrating one implementation of a moving-magnetizable-element converter.
FIG. 5 is a flow chart illustrating one implementation of a process for fluid regulation.

One example of electric-to-pressure converter 210 is illustrated by electric-to-pressure converter 300 in FIG. 3. In this implementation, converter 300 includes a cup core 311, a coil of wire 313 surrounding a central-post armature 312 of core 311, and a movable, magnetizable flexure 314, which may be a hinged flapper. To adjust pressure, flexure 314 moves relative to an orifice 316 of a passage 315 through which a supply pressure is vented to a pressure cavity 317. By adjusting the force on flexure 314 relative to orifice 316, the pressure in pressure cavity 317 may be adjusted. The adjusted supply pressure is then provided to relay 220, which is responsible for boosting the pressure and/or volume of the air flow. This converter configuration may provide a high power conversion efficiency (e.g., $(\text{Volts}_{In} * \text{Amps}_{In})/(\text{Pressure}_{Out} * \text{Flow}_{Out})$)

When using a coil of wire with a magnetic core and a movable flexure, a significant amount of hysteresis and/or deadband may be encountered. Deadband occurs when a change in input signal produces no change in the output of a device. Often, the lack of response is the result of friction between a moving element and a stationary element. Hysteresis occurs when an element does not return to its original state after applying a force to the element, which typically leads to the element not producing the same response to an input signal. Often, the difference in response depends on the current direction of travel. Deadband and hysteresis are sometimes experienced in moving-magnetizable-element converters due to interferences in the way of the moving flexure and to energy absorbed in the core, which acts on the movable flexure.

Electric-to-pressure converter 200 in FIG. 2 also includes a pressure sensor 230, a signal conditioner 240, and a controller 250. Pressure sensor 230 is operable to sense the pressure generated by converter 210 and generate a signal representative thereof. Pressure sensor 230 may, for example, be a piezo-type sensor. Signal conditioner 240 is responsible for converting the pressure sensor signal into a format that is compatible with a command signal. For example, if the command signal ranges from 0 V to 10 V for full operation of the converter, signal conditioner 240 may convert the pressure sensor signal to a comparable scale. The pressure sensor signal is also fed to the system processor.

Controller 250 receives a representation of the command signal and the conditioned pressure signal and produces a control signal for converter 210. The representation of the signals may, for example, be a difference between a value of the signals (e.g., an error signal). Controller 250 may also condition the signal representation using any appropriate techniques (e.g., amplification and filtering). Controller 250 may, for example, be an analog processor that provides proportional-integral-derivative (PID) control.

In particular implementations, controller 250 may introduce an approximately ten-fold gain to the signal representation and provide a controlled frequency response (e.g., rolling off high-frequency gain) to prevent oscillation. Controller 250 may, for example, include a differential amplifier that compares a desired set point to the sensed pressure. If the differential amplifier has a gain of ten, a 1 mV change in set point will produce a 10 mV change.

As one example of a loop set up, assume that the forward loop has a gain of K1, the feedback loop has a gain of K2, and hysteresis H is introduced to the plant. Then, the output Y is related to the input X by the follow equation:

$Y=(X-K2*Y)*K1+H.$

Rearranging the terms to isolate Y from X and H, leads to:

$Y*(1+K1*K2)=X*K1+H;$ and $Y=(X*K1+H)/(1+K1*K2).$

Allowing K1 to equal 10, and K2 to equal 0.9, leads to:

$Y=(10*X+H)/(1+0.9*10);$ and $Y=X+H/10.$

Thus, the contribution of hysteresis to the output may be reduced by a factor of ten.

In certain implementations, pressure sensor 230 may be uncompensated. Although uncompensated pressure sensors are typically less accurate than compensated pressure sensors, often by an order of magnitude, the repeatability of uncompensated pressure sensors and of compensated pressure sensors is typically similar. In particular implementations, pressure sensor 230 may be compensated for zero but not span or temperature, which may reduce the error by about one-half. Also, because temperature is typically a slowly changing variable, an outer control loop may compensate for such changes, whether directly or indirectly.

The introduction of pressure sensor 230, signal conditioner 240, and controller 250 to electric-to-pressure converter 200 may reduce the hysteresis, deadband, and/or non-linearity of converter 210. For example, by introducing a large gain (e.g., ten) to a command signal, deadband, hysteresis, and non-linearity may be alleviated or eliminated. Due to the removal of these impediments, other features may also be realized, such as the ability to use larger wire sizes for a coil and the ability to protect a wire coil from the environment. Also, the converter's dynamic performance, start-up behavior, and reaction to abnormal conditions (e.g., air loss) may be improved.

Although FIG. 2 illustrates one implementation of a control system for an electric-to-pressure converter, other control systems for electric-to-pressure converters are possible. For example, a control system may also implement feedforward techniques. As another example, a control system could be implemented by digital techniques.

Figure 4:
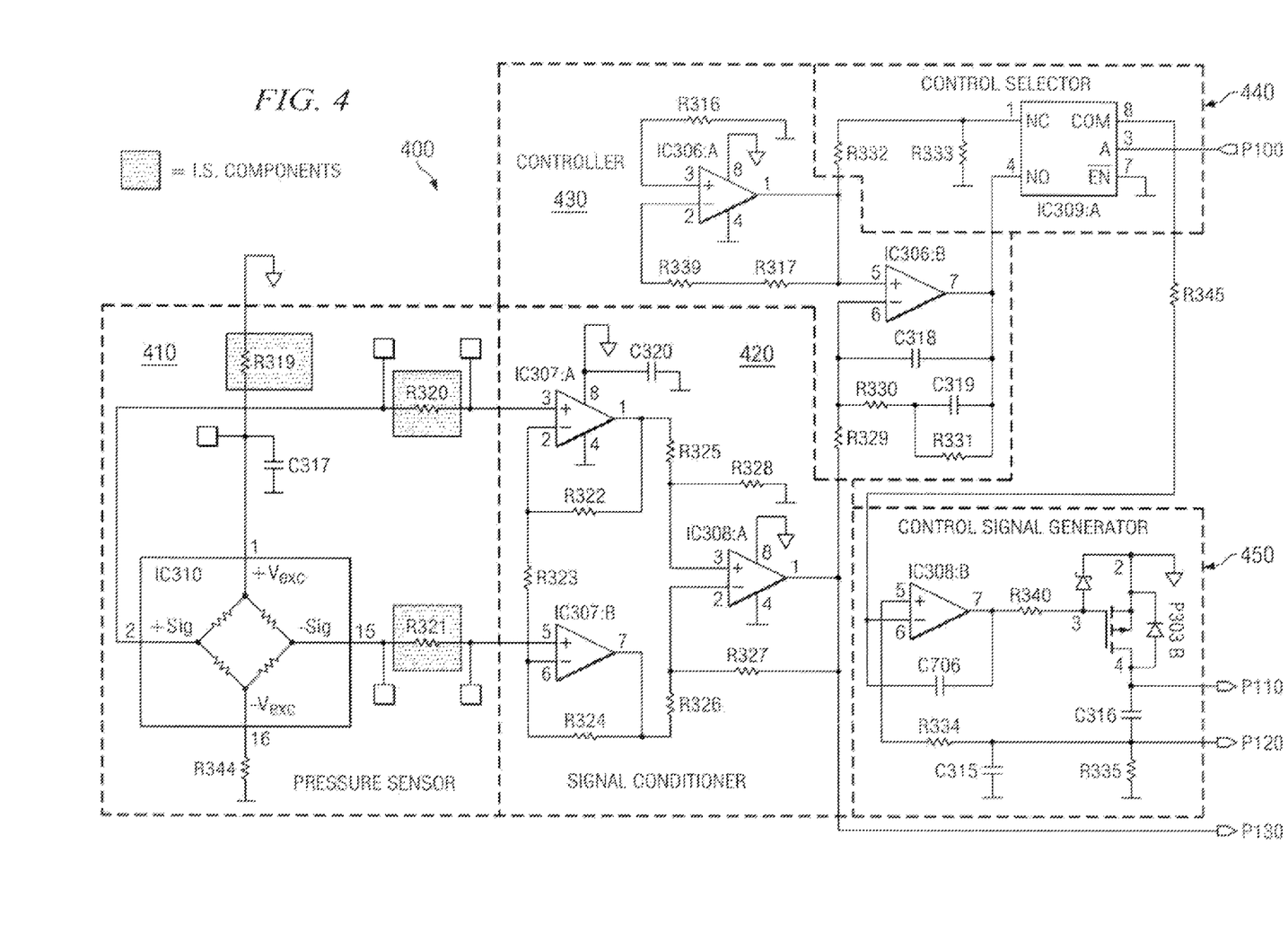
FIG. 4 is a schematic diagram illustrating one implementation of a control circuit for an electric-to-pressure converter.

FIG. 4 illustrates one example of a control circuit 400 for an electric-to-pressure converter. Control circuit 400 includes a pressure sensor 410, a signal conditioner 420, and a controller 430. Pressure sensor 410 is operable to sense the pressure generated by the associated converter and generate a representative signal, signal conditioner 420 is operable to convert the pressure-representative signal into a command-signal format, and controller 430 is operable to generate a control signal for the converter based on the conditioned pressure-representative signal and a command signal.

In more detail, pressure sensor 410 includes a piezo-resistive pressure sensor IC310. Pressure sensor IC310 is operable to sense the pressure generated by the associated converter and generate a signal representative thereof, which is output in part as a positive and a negative. Resistors 319-321 of pressure sensor 410 are intrinsically safe.

Signal conditioner 420 may provide pressure signal amplification and signal conditioning. As illustrated, signal conditioner 420 includes an operational amplifier 307:A and an operational amplifier 307:B in voltage follower configuration, one for the positive component and one for the negative component. Operational amplifiers 307 may buffer the signal components from the rest of circuit 400. The output of operational amplifiers 307 is fed to operational amplifier IC308:A, which behaves as a differential amplifier between the two signal components. The output of operational amplifier IC308:A is sent to controller 430 and a processor for the associated fluid regulator controller, through a coupler P130.

Controller 430 includes an operational amplifier IC306:A in voltage follower configuration and an operational amplifier IC306:B, which behaves as a differential amplifier. The input to operational amplifier IC306:A is the command signal to the associated converter. The inputs to operational amplifier IC306:B include the output of operational amplifier IC306:A and the output of operational amplifier IC308:A. Thus, operational amplifier IC306:B compares the command signal to the conditioned pressure-representative signal and amplifies the difference. The output of IC306:B is provided to a control selector 440, which also receives the output of IC306:A.

Control selector 440 includes a switch IC309:A that allows control circuit 400 to operate in open-loop or closed-loop mode. If in open-loop mode, the switch provides the command signal as the output. If in closed-loop mode, the switch provides the amplified difference between the conditioned pressure-representative signal and the command signal as the output. The mode of operation of switch IC309:A is controlled by a signal received through a coupler P100. The signal may, for example, be controlled by a processor for the associated fluid regulator controller. This provides a failsafe in case pressure sensor 410 fails, which may make it difficult to move the associated fluid regulator to the appropriate position (e.g., closed). Switch IC309:A may, for example, be a single-pole double-throw switch.

Control circuit 400 also includes a control signal generator 450. Control signal generator 450 includes an operational amplifier IC308:B, which behaves as a differential amplifier comparing a voltage representation of a loop current to the converter to the amplified voltage difference between the command signal and the conditioned pressure-representative signal. A converter-loop signal is sent to the converter through a coupler P110 and returned through a coupler P120. The voltage in the converter loop is sensed across a resistor 335. Control signal generator 450 also includes a transistor P303:B, which controls the current to the converter based on the voltage difference from operational amplifier IC308:B. Together, operational amplifier IC308:B and transistor 303:B form a circuit with feedback, which is based on the voltage across resistor R335.

FIG. 5 illustrates a process 500 for fluid regulation. Process 500 may be one example of a mode of operation for feedback-controlled electric-to-pressure converter 124 of system 100.

Process 500 begins with waiting to receive a command signal (operation 504). The command signal may relate directly or indirectly to a position (e.g., specify a pressure to be achieved). Once a command signal has been received, process 500 calls for generating a control signal for an electric-to-pressure converter based on the command signal (operation 508). The converter may, for instance, include a magnetized core surrounded by a wire coil with an iron-alloy flexure at one end. Process 500 also calls for generating a pressure in accordance with the control signal (operation 512). Generating a pressure may, for example, include moving the flexure relative to a pneumatic orifice.

Process 500 continues with sensing the generated pressure (operation 516). The pressure may, for example, be sensed with a piezoresistive-type sensor. The pressure signal is then conditioned (operation 520). For example, the pressure signal may be converted to a command signal format.

Process 500 continues with determining whether a new position command signal has been received (operation 524). If a new position command signal has not been received, process 500 calls for adjusting the control signal based on the conditional pressure signal and the command signal (operation 528). Adjusting the control signal based on the conditioned pressure signal and the command signal may include comparing the command signal with the conditioned pressure signal and amplifying a difference between the signals. Process 500 continues with generating a pressure in accordance the adjusted control signal (operation 512). Process 500 may continue sensing the generated pressure (operation 516), adjusting the control signal based on the conditioned pressure signal and the command signal (operation 528), and generating a pressure in accordance with the adjusted control signal (operation 512) for any appropriate number of cycles or period of time.

If, however, a new command signal has been received, process 500 calls for adjusting the control signal based on the conditioned pressure signal and the new command signal (operation 532). Adjusting the control signal based on the conditioned pressure signal and the new command signal may include comparing the new command signal with the conditioned pressure signal. Process 500 continues with generating a pressure in accordance with the adjusted control signal (operation 512). Process 500 may continue sensing the generated pressure (operation 516), adjusting the control signal based on the conditioned pressure signal and a new command signal (operation 532), and generating a pressure in accordance with the adjusted control signal (operation 512) for any appropriate number of cycles or period of time.

Although FIG. 5 illustrates a process for fluid regulation, other processes for fluid regulation may include fewer, additional, and/or a different arrangement of operations. For example, a fluid regulation process may not include generating a control signal for a converter. The command signal may, for instance, already be in the proper format. As another example, a fluid regulation process may include amplifying a difference between the conditioned pressure signal and a command signal. As a further example, a fluid regulation process may include modifying the conditioned pressure signal before comparing it to the command signal. As an additional example, a fluid regulation process may include conditioning (e.g., amplifying and filtering) one or more signals. Furthermore, various operations may occur contemporaneously or simultaneously.

Figure 6:
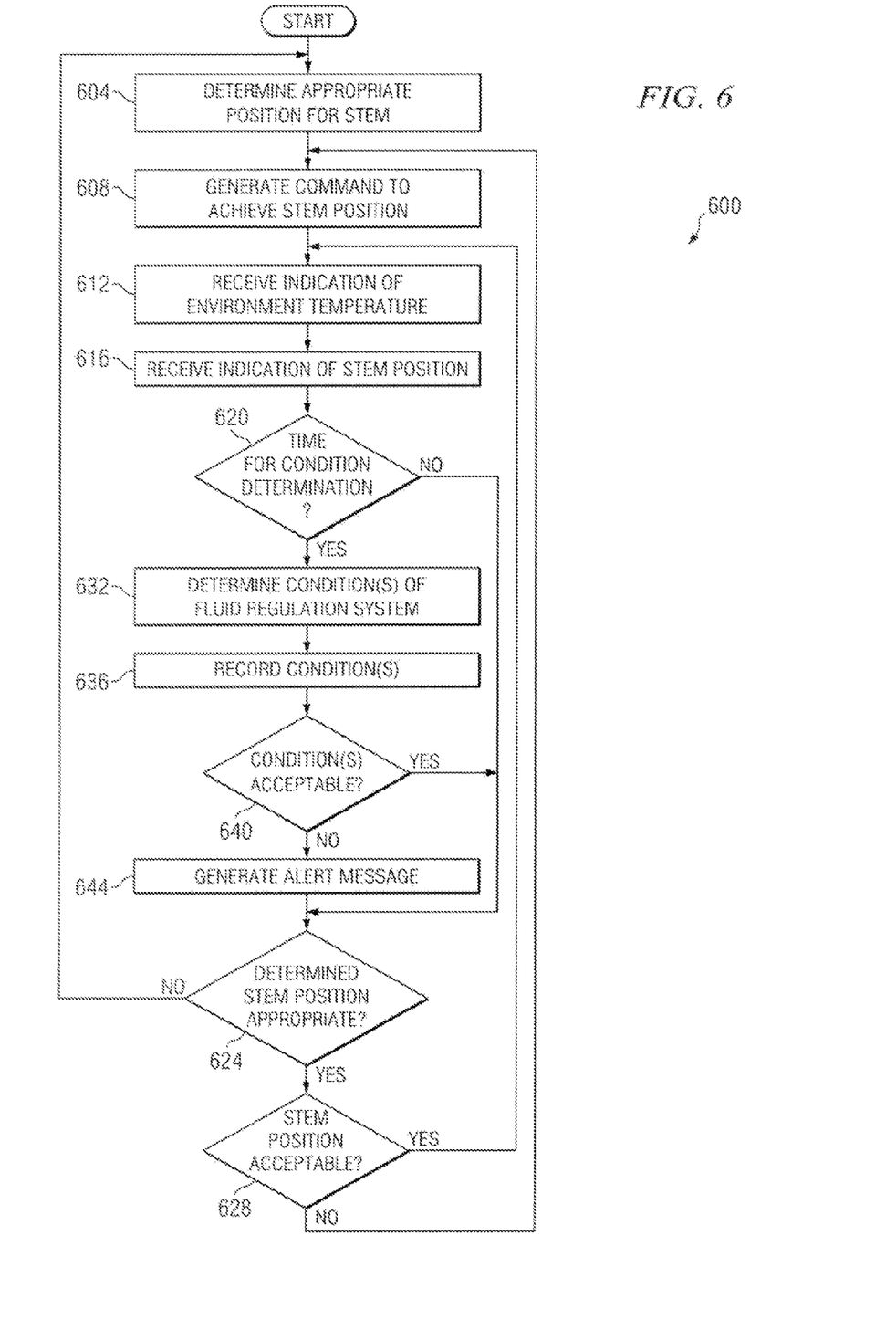
FIG. 6 is a flow chart illustrating another implementation of a process for fluid regulation.

FIG. 6 illustrates a process 600 for fluid regulation. Process 600 may be one example of a mode of operation for processor 126 of system 100.

Process 600 begins with determining an appropriate position for a stem (operation 604). Determining an appropriate position for a stem may, for example, be accomplished by evaluating instructions regarding a flow parameter (e.g., a flow rate) to be achieved. Process 600 also calls for generating a command to achieve the stem position (operation 608). The command may be in the form of a signal, which in some implementations may be part of a message, and may relate directly or indirectly to a stem position (e.g., a pressure to achieve the stem position).

Process 600 continues with receiving an indication of environment temperature (operation 612). The environment temperature may be an internal temperature of a fluid regulator controller, an external temperature of a fluid regulator controller, or any other appropriate temperature. Process 600 also calls for receiving an indication of a stem position (operation 616). The temperature and stem position may be detected by any appropriate sensors.

Process 600 additionally calls for determining whether it is time to perform a system condition determination (operation 620). The time for performing a system condition determination may be based on an elapsed time since making a previous determination, a detection of a material change in a system parameter, the receipt of a status inquiry, or any other appropriate event. In particular implementations, the sensed system parameters are received much faster than the system condition determinations are performed.

If it is not time to perform a system condition determination, the process calls for determining whether the determined stem position is still appropriate (operation 624). The determined stem position may not be appropriate, for example, if new regulation instructions have been received. If the determined stem position is not still appropriate, the process continues with determining another appropriate stem position (operation 604).

If, however, the stem position is still appropriate, the process continues with determining whether the stem position is acceptable (operation 628). The stem position may not be acceptable, for example, if it is not within a certain percentage (e.g., 1%) of the determined stem position. If the stem position is not acceptable, the process calls for generating another command to achieve the stem position (operation 608). If, however, the stem position is acceptable, the process calls for receiving updates of the system parameters (operations 612-616).

If it is time to perform a system condition determination (operation 620), process 600 calls for determining at least one condition of the fluid regulation system (operation 632). Example conditions include supply pressure change, converter performance, and fluid regulator health. The conditions are then recorded (operation 636) and analyzed to determine whether they are acceptable (operation 640). A condition may not be acceptable, for example, if it indicates a malfunction in a fluid regulation system component or if it is out of range. If a condition is not acceptable, an alert message is generated (operation 644). This message may be presented locally and/or sent to a remote device (e.g., a server or a personal digital assistant). After the message has been generated, or if the conditions are acceptable, the process continues with determining whether the determined stem position is still appropriate (operation 628).

Although FIG. 6 illustrates one implementation of a process for fluid regulation, other processes for fluid regulation may include fewer, additional, and/or a different arrangement of operations. For example, receiving the indications regarding the system parameters—the temperature and the stem position—may occur in any order. As another example, an indication may not be received regarding one or more of the system parameters. As a further example, indications of other system parameters (e.g., supply pressure or converter output pressure) may be received. As an additional example, determining a system condition may occur if and/or when an indication of a system parameter is received. As another example, system conditions may not be recorded. This may occur, for instance, if the conditions are communicated after they are determined. As a further example, a message representing one or more system conditions may be generated, perhaps in response to a status query. As another example, a process may include determining an appropriate position for a plug. Furthermore, various operations may occur contemporaneously or simultaneously.

A number of implementations have been discussed, and several others have been mentioned or suggested. Furthermore, various additions, deletions, substitutions, and/or modifications to these implementations will be readily suggested to those skilled in the art while still accomplishing fluid regulation control. Accordingly, the invention is to be measured by the scope of the following claims, which may encompass one or more aspects of one or more of the implementations.

The invention claimed is:

1. A fluid regulation system, the system comprising:
   a pressure cavity operable to receive a pressure supply for generating a pressure signal for controlling a fluid regulator;
   an electric-to-pressure converter comprising:
      a wire coil operable to be energized according to a control signal,
      a magnetizable element movable relative to the wire coil in response to the energy in the wire coil, the position of the element affecting the pressure in the pressure cavity to generate the pressure signal;
   a pressure sensor coupled to the pressure cavity and operable to sense the pressure in the pressure cavity due to the position of the magnetizable element and to generate a signal representative thereof, the pressure in the pressure cavity comprising a first sensed parameter of the fluid regulation system, and
   a controller coupled to the wire coil and the pressure sensor, the controller operable to:
      generate the control signal in response to a received command signal, and
      adjust the control signal based on the pressure sensor signal and the received command signal;

a second sensor operable to sense a second parameter of the fluid regulation system and to generate a signal representative thereof; and a processor coupled to the electric-to-pressure converter and the second sensor, the processor operable to:
generate the command signal, and
adjust the command signal based on the second sensor signal.

2. The system of claim 1, wherein the controller is operable to amplify a difference between the pressure sensor signal and the received command signal to adjust the control signal based on the pressure sensor signal and the received command signal.

3. The system of claim 2, wherein the controller is further operable to suppress high-frequency gain.

4. The system of claim 2, wherein the electric-to-pressure converter further comprises a signal conditioner operable to convert the pressure sensor signal to the command signal format.

5. The system of claim 1, wherein:
the pressure cavity comprises a pressure conduit having an orifice that discharges onto the magnetizable element;
the electric-to-pressure converter further comprises a magnetic core around which the wire coil is disposed, the magnetizable element being proximate an end of the wire coil; and
the pressure sensor comprises a piezo-type sensor.

6. The system of claim 1, wherein the pressure sensor is partially-compensated.

7. The system of claim 1, wherein the second sensor comprises a position sensor operable to determine the position of a fluid regulator component.

8. The system of claim 1, further comprising a third sensor operable to sense a third parameter of the fluid regulation system and generate a signal representative thereof, the processor coupled to the third sensor and operable to adjust the command signal based on the second sensor signal and the third sensor signal.

9. The system of claim 1, wherein the processor is operable to receive instructions for regulating the fluid regulation system.

10. The system of claim 9, wherein the instructions comprise a set point.

11. The system of claim 1, wherein the controller is adapted to provide a frequency response for control that is approximately ten times faster than the frequency response of the control provided by the processor.

12. The system of claim 1, wherein the pressure signal is adapted to control a fluid regulator member.

13. The system of claim 12, wherein the pressure signal corresponds to a travel of a fluid regulator member.

14. The system of claim 1, wherein the processor and controller are separate devices.

15. The system of claim 14, wherein the controller consists essentially of analog circuitry to generate and adjust the control signal.

16. A method for fluid regulation at a fluid regulation system, the method comprising:
generating a control signal based on a received command signal;
moving a magnetizable element relative to a wire coil in accordance with the control signal, the position of the element affecting a pressure in a pressure cavity to generate a pressure signal for controlling a fluid regulator;
sensing the pressure in the pressure cavity due to the position of the magnetizable element, the pressure in the pressure cavity comprising a first sensed parameter of the fluid regulation system;
adjusting the control signal based on the sensed pressure and the command signal;
sensing a second parameter of the fluid regulation system; and
adjusting the command signal based on the second parameter.

17. The method of claim 16, wherein adjusting the control signal based on the sensed pressure and the command signal comprises:
converting the sensed pressure into the command-signal format;
comparing the pressure signal and the command signal; and
amplifying a difference between the signals.

18. The method of claim 17, further comprising reducing high-frequency gain of the amplified difference.

19. The method of claim 17, wherein comparing the pressure signal and the command signal comprises subtracting the pressure signal from the command signal.

20. The method of claim 16, further comprising:
sensing a third parameter of the fluid regulation system; and
adjusting the command signal based on the second parameter and the third parameter.

21. The method of claim 16, further comprising receiving instructions for regulating the fluid regulation system.

22. The method of claim 16, wherein adjusting the control signal based on the sensed pressure and the command signal is provided at a frequency response approximately ten times faster than the frequency response of the control provided by adjusting the command signal based on the second parameter.

23. A system for fluid regulation, the system comprising:
a pneumatic supply line operable to receive a pneumatic pressure supply for generating a pressure control signal, the supply line having an orifice;
an electric-to-pressure converter comprising:
a wire coil operable to be energized according to a control signal,
a nickel-iron alloy element movable relative to the wire coil in proximity to the orifice, the magnetizable element movable in response to the energy in the wire coil, the position of the element affecting the pneumatic pressure in a pressure cavity to generate the pressure control signal,
a partially-compensated pressure sensor coupled to the pressure cavity, the pressure sensor operable to sense the pressure in the pressure cavity due to the position of the magnetizable element and to generate a signal representative thereof,
a signal conditioner operable to convert the pressure signal to a command-signal format, and
a controller coupled to the wire coil and the signal conditioner, the controller operable to:
generate the control signal in response to a received command signal, and
adjust the control signal based on the converted pressure sensor signal and the command signal by amplifying a difference between the converted pressure sensor signal and the received command signal and suppressing high-frequency gain;

a position sensor operable to sense a position of a fluid regulator component and generate a representative signal; and a processor coupled to the electric-to-pressure converter and the position sensor, the processor operable to:

receive instructions for regulating the fluid regulation system, generate the command signal, and adjust the command signal based on the position sensor signal;

wherein the controller is adapted to provide a frequency response for control that is approximately ten times faster than the frequency response of the control provided by the processor.

* * * * *

UNITED STATES PATENT AND TRADEMARK OFFICE
CERTIFICATE OF CORRECTION

PATENT NO. : 7,493,195 B2  Page 1 of 1
APPLICATION NO. : 11/419161
DATED : February 17, 2009
INVENTOR(S) : Peter S. Levesque It is certified that error appears in the above-identified patent and that said Letters Patent is hereby corrected as shown below:

In column 7 at line 55 of the issued patent, after ")))" please insert -- . --.

Signed and Sealed this

Twenty-sixth Day of May, 2009

JOHN DOLL
*Acting Director of the United States Patent and Trademark Office*